United States Patent
Guering

(10) Patent No.: US 9,731,823 B2
(45) Date of Patent: Aug. 15, 2017

(54) CENTER PEDESTAL FOR AIRCRAFT COCKPIT AND AIRCRAFT COMPRISING SUCH A PEDESTAL

(75) Inventor: Bernard Guering, Montrabe (FR)

(73) Assignee: Airbus Operations (S.A.S.), Toulouse (FR)

(*) Notice: Subject to any disclaimer, the term of this patent is extended or adjusted under 35 U.S.C. 154(b) by 91 days.

(21) Appl. No.: 13/985,024

(22) PCT Filed: Jan. 30, 2012

(86) PCT No.: PCT/FR2012/050189
§ 371 (c)(1),
(2), (4) Date: Oct. 23, 2013

(87) PCT Pub. No.: WO2012/110725
PCT Pub. Date: Aug. 23, 2012

(65) Prior Publication Data
US 2014/0042272 A1   Feb. 13, 2014

(30) Foreign Application Priority Data
Feb. 18, 2011  (FR) ...................................... 11 51346

(51) Int. Cl.
*B64D 11/00* (2006.01)
*B64D 31/04* (2006.01)
*B64D 43/00* (2006.01)

(52) U.S. Cl.
CPC .............. *B64D 11/00* (2013.01); *B64D 31/04* (2013.01); *B64D 43/00* (2013.01)

(58) Field of Classification Search
CPC .......................... B64D 11/0015; B64D 43/00; B64D 11/0689; B64D 45/00; B60R 11/0229

(Continued)

(56) References Cited

U.S. PATENT DOCUMENTS 1,011,026 A   12/1911  Carpenter
2,413,986 A    1/1947  Cleo
(Continued)

FOREIGN PATENT DOCUMENTS

EP   1 693 248   8/2006
FR   2 900 634   11/2007
(Continued)

OTHER PUBLICATIONS

DS3695, 'Application Note 454 Automotive Multiplex Wiring', Apr. 1997.*

(Continued)

*Primary Examiner* — Brian M O'Hara
*Assistant Examiner* — Assres H Woldemaryam
(74) *Attorney, Agent, or Firm* — Jenkins, Wilson, Taylor & Hunt, P.A.

(57) ABSTRACT

The invention relates to an aircraft cockpit center pedestal for the attachment of control and instrumentation equipment for this aircraft, wherein the center pedestal includes an equipment module including controls connected to at least one first electrical connector, and a single-piece frame including an upper face provided with a recess including at least one second electrical connector installed at the bottom of the recess and connected to computers onboard this aircraft in which this equipment module is installed, the at least one first electrical connector of the equipment module being inserted into at least one second electrical connector so as to connect the controls of the equipment module and these onboard computers. The invention also relates to an aircraft including such a pedestal.

8 Claims, 6 Drawing Sheets

(58) Field of Classification Search
USPC ...... 244/118.5, 121; 36/679.01; 74/471, 504
See application file for complete search history.

(56) References Cited

U.S. PATENT DOCUMENTS

| | | | |
|---|---|---|---|
| D149,798 S | 6/1948 | Crawford | |
| 3,599,510 A * | 8/1971 | Scott et al. | ............ 74/625 |
| 3,675,880 A * | 7/1972 | Koch | ............ 244/234 |
| 4,153,127 A | 5/1979 | Klink et al. | |
| 4,568,045 A | 2/1986 | Mayer | |
| 4,984,755 A | 1/1991 | Derrien | |
| 5,100,083 A | 3/1992 | Large et al. | |
| 5,195,804 A | 3/1993 | Stolle | |
| 5,314,143 A | 5/1994 | Luria | |
| 5,544,842 A | 8/1996 | Smith | |
| 6,025,831 A * | 2/2000 | Gardiner | ............ 345/157 |
| 6,119,060 A * | 9/2000 | Takayama | ............ B60K 35/00 307/9.1 |
| 6,169,249 B1 | 1/2001 | Teachout et al. | |
| D442,958 S * | 5/2001 | Funakoshi | ............ D14/402 |
| 6,305,643 B1 | 10/2001 | Sankrithi | |
| 6,354,152 B1 * | 3/2002 | Herlik | ............ 73/597 |
| 6,454,208 B1 | 9/2002 | Nervig et al. | |
| 6,464,169 B1 | 10/2002 | Johnson et al. | |
| 6,477,053 B1 | 11/2002 | Zeidan et al. | |
| 6,824,100 B1 | 11/2004 | Cheetham | |
| 6,903,720 B1 * | 6/2005 | Glithero | ............ 345/156 |
| 6,910,736 B2 | 6/2005 | White | |
| 6,984,784 B2 | 1/2006 | Nagasaka et al. | |
| 7,188,400 B1 * | 3/2007 | Beseth | ............ B64D 43/00 29/428 |
| 7,320,503 B2 | 1/2008 | Eysing | |
| 7,417,866 B1 * | 8/2008 | Beseth | ............ H05K 7/1409 361/728 |
| 7,621,481 B2 | 11/2009 | Hershberger et al. | |
| 7,627,221 B2 | 12/2009 | Morris | |
| 7,784,736 B2 | 8/2010 | Guering et al. | |
| 7,784,871 B2 | 8/2010 | Cochran | |
| 7,909,402 B2 | 3/2011 | Chu et al. | |
| 7,942,366 B2 | 5/2011 | Waide | |
| 8,174,845 B2 | 5/2012 | Ozaki et al. | |
| 8,186,620 B2 | 5/2012 | Luce et al. | |
| 8,602,352 B2 | 12/2013 | Keller et al. | |
| 9,271,406 B2 | 2/2016 | Guering | |
| 9,272,775 B2 | 3/2016 | Guering | |
| 2004/0169275 A1 | 9/2004 | Danvir et al. | |
| 2004/0256899 A1 | 12/2004 | Moore et al. | |
| 2005/0133308 A1 | 6/2005 | Reysa et al. | |
| 2005/0230540 A1 | 10/2005 | Harrington et al. | |
| 2006/0255635 A1 | 11/2006 | Iijima et al. | |
| 2007/0164152 A1 | 7/2007 | Anderson et al. | |
| 2008/0149769 A1 | 6/2008 | Koch et al. | |
| 2008/0230650 A1 | 9/2008 | Meyer et al. | |
| 2009/0294394 A1 | 12/2009 | Girlich | |
| 2010/0050803 A1 * | 3/2010 | Stamate | ............ 74/471 XY |
| 2010/0078533 A1 * | 4/2010 | Bopp et al. | ............ 248/220.21 |
| 2010/0085695 A1 * | 4/2010 | Vicich et al. | ............ 361/679.21 |
| 2010/0085710 A1 * | 4/2010 | Bopp et al. | ............ 361/697 |
| 2010/0090868 A1 * | 4/2010 | Hall | ............ 340/971 |
| 2010/0140397 A1 | 6/2010 | Wassenhove | |
| 2010/0308166 A1 | 12/2010 | Bovelli | |
| 2011/0194300 A1 | 8/2011 | Olsen | |
| 2012/0037752 A1 | 2/2012 | Collins | |
| 2012/0285950 A1 | 11/2012 | Guering | |
| 2013/0112808 A1 | 5/2013 | Guering | |
| 2014/0168907 A1 | 6/2014 | Guering | |

FOREIGN PATENT DOCUMENTS

| | | |
|---|---|---|
| FR | 2 910 875 | 7/2008 |
| FR | 2 939 766 | 6/2010 |
| GB | 2 131 779 | 11/1983 |
| WO | WO 02/102203 | 12/2002 |
| WO | WO 2006/101417 | 9/2006 |
| WO | WO 2010/069923 | 6/2010 |
| WO | WO 2012/095605 | 7/2012 |
| WO | WO 2012/110725 | 8/2012 |
| WO | WO 2012/149978 | 11/2012 |

OTHER PUBLICATIONS

DOT, "Structural Testing and Analysis of Honeycomb Sandwich Composite Fuselage Panels". Dec. 2008, p. 2.*
Preliminary Search Report for Application No. FR 1262067 dated Aug. 9, 2013.
Preliminary Search Report for Application No. FR 1262144 dated Sep. 2, 2013.
Non-Final Office Action for U.S. Appl. No. 14/090,882 dated May 27, 2014.
French Search Report and Written Opinion for Application No. FR 050189 dated Jan. 10, 2014.
Interview Summary for U.S. Appl. No. 14/090,882 dated Oct. 3, 2014.
Non-Final Office Action for U.S. Appl. No. 14/090,882 dated Dec. 18, 2014.
Non-Final Office Action for U.S. Appl. No. 13/632,812 dated Dec. 29, 2014.
French Search Report for Application No. PCT/FR2012/050064 dated Apr. 18, 2012.
French Search Report for FR 1261341 dated Oct. 2, 2013.
French Search Report for Application No. FR 1151346 dated Sep. 12, 2011.
Notice of Allowance for U.S. Appl. No. 13/978,243 dated Nov. 6, 2015.
Final Office Action for U.S. Appl. No. 13/632,812 dated Apr. 16, 2015.
Non-Final Office Action for U.S. Appl. No. 13/978,243 dated Jul. 20, 2015.
English Translation of the International Search Report and Written Opinion for Application No. PCT/FR2012/050064 dated Apr. 26, 2012.
English Translation of the International Search Report and Written Opinion for Application No. PCT/FR2012/050189 dated Jan. 16, 2014.

* cited by examiner

CENTER PEDESTAL FOR AIRCRAFT COCKPIT AND AIRCRAFT COMPRISING SUCH A PEDESTAL

TECHNICAL FIELD

The invention relates to a centre pedestal for an aircraft cockpit and an aircraft comprising such a pedestal.

An airplane type aircraft will be considered in the following, to simplify the description.

STATE OF PRIOR ART

The context of the invention is research to achieve a global improvement to aircraft nose cones. Within this framework, all major components of cockpits are concerned and particularly the centre pedestal, usually integrated into all instrument panels and glareshield panels.

Such a centre pedestal shown in FIG. 1 is located on the deck of the cockpit between the two pilots. In the cockpit 10, in particular the centre pedestal 11, the side benches 12, the instrument panels 13 and the glareshield panel 14 are shown. As shown in FIGS. 2A, 2B and 2C, the centre pedestal 11 comprises a number of items of major equipment for flying an aircraft, namely particularly:
  aircraft left and right engine thrust controls 20 and 21,
  slat and flap controls 22 and 23,
  landing gear extension controls 24,
  navigation and radio controls,
  the CDU (Control Display Unit) type display means 26, 27, 28,
  INTERNET function piloting control means 31 and 32,
  trim compensation means 29.

This equipment is located on an upper plane of the centre pedestal 11 and is very accessible for the pilots, while being supported by a mechanical frame 30. This equipment is fixed individually on the centre pedestal, for example by a screw located in each corner of its front face. Its electrical power supplies are also made individually and usually based on wire connections.

The pedestal according to prior art shown in FIGS. 2A, 2B and 2C comprises a variety of disparate equipment (control levers, electronic boxes, keyboard, etc.), individually fixed to the frame 30, wiring 33 being used for each equipment. The frame 30 is a complex mechanical assembly composed of a perforated structure that is not very rigid and is weakened because it provides individual integration to each equipment. The integration of equipment on the frame 30 is difficult (weight, volume and stiffness). The environment of the instrument panels 13 and this pedestal 11 is very dense because the wiring of equipment is difficult and an access through the front deck (manhole) is necessary.

The purpose of this invention is to radically overcome all these disadvantages by integrating an assembly that in the past was composed of a multitude of equipment located on a frame, as a single module.

PRESENTATION OF THE INVENTION

The invention relates to an aircraft cockpit centre pedestal for the attachment of control and instrumentation equipment for this aircraft, characterised in that the centre pedestal comprises:
  an equipment module comprising controls connected to at least one first electrical connector,
  a single-piece frame comprising an upper face provided with a recess comprising at least one second electrical connector installed at the bottom of the recess and connected to computers onboard this aircraft, in which this equipment module is installed, the at least one first electrical connector of the equipment module being inserted into at least one second electrical connector so as to connect the controls of the equipment module and these onboard computers.

Advantageously, the connection wiring of the equipment module is multiplexed wiring. The first electrical connectors centralised on the front face of the equipment module are inserted in second electrical connectors installed at the bottom of the recess. The single-piece frame is made from a composite sandwich, for example from Nomex honeycomb carbon. The frame comprises:
  at least two and for example four attachment points in the lower part to fix it onto the cockpit deck.

In one variant embodiment, the frame comprises an articulated upper face, for example by means of two lateral actuators. The centre pedestal of the invention can then release a very significant volume in the zone located underneath and in the front dead zone.

There are many possible ways of using the volume thus generated:
  integration of a folding seat for use by a central observer under the centre pedestal,
  integration of oxygen cylinders for use in the cockpit,
  integration of a system module, for example a small electrical first aid core or a small emergency avionics bay (optimised position considering risks in this zone),
  integration of a storage compartment dedicated to the crew, this compartment possibly being extracted from the back by slides or rollers,
  integration of a removable cooled icebox or a toilet,
  storage of a bag or small cases.

DETAILED PRESENTATION OF PARTICULAR EMBODIMENTS

Figure 1:
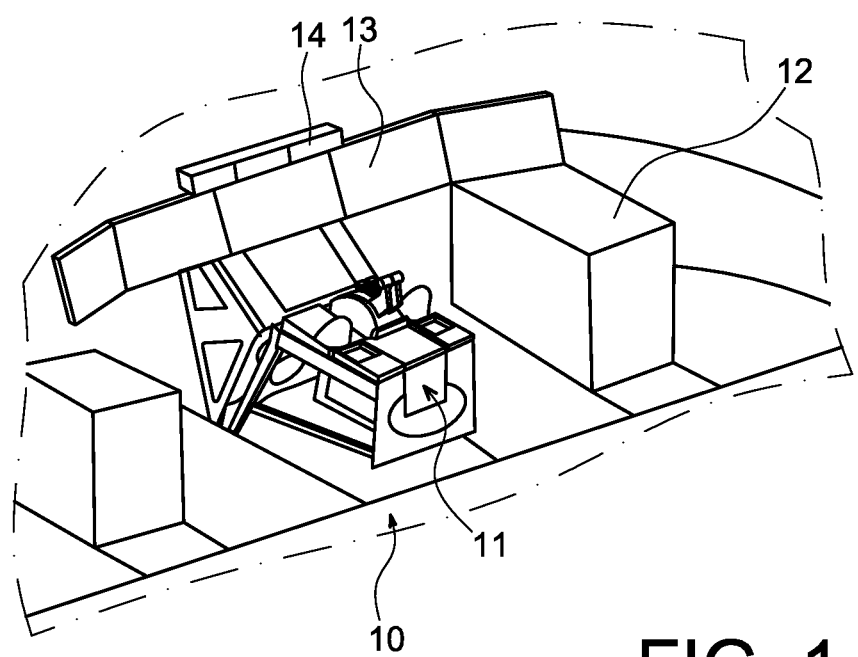
FIG. 1 shows a centre pedestal according to prior art installed in the cockpit of an aircraft.
Figure 2A:
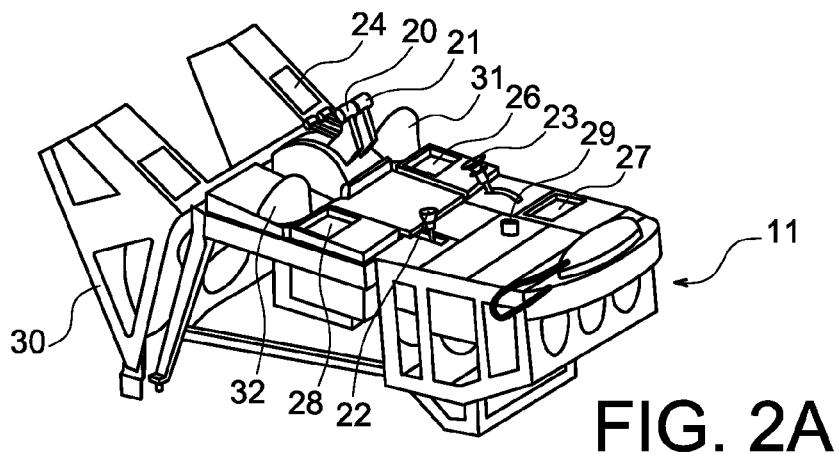
FIGS. 2A to 2C show a centre pedestal according to prior art.
Figure 2B:
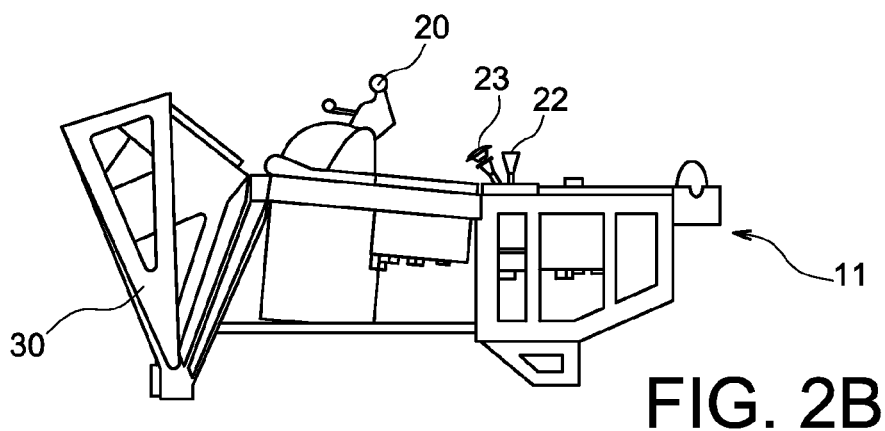
Figure 2C:
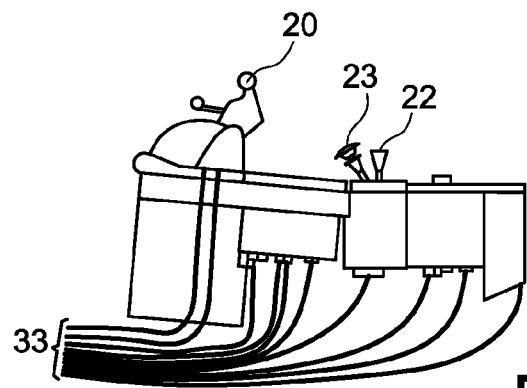
Figure 3A:
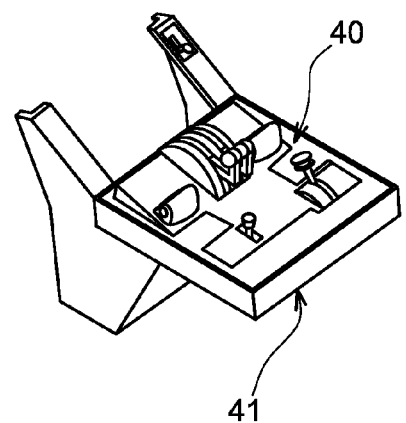
FIGS. 3A to 3D show the centre pedestal according to the invention comprising an equipment module 40 and a support frame 41 supporting the equipment module.
Figure 3B:
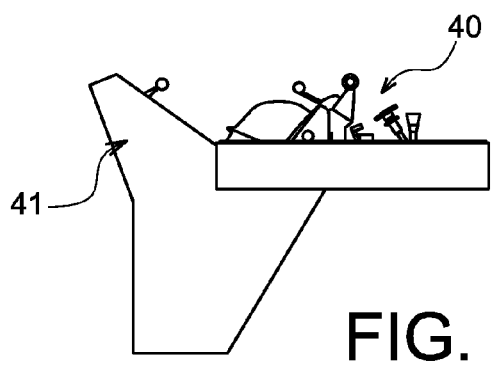
Figure 3C:
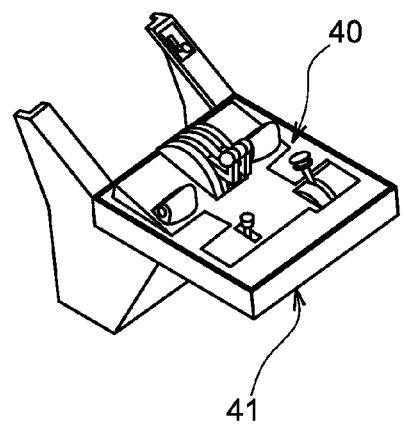
Figure 3D:
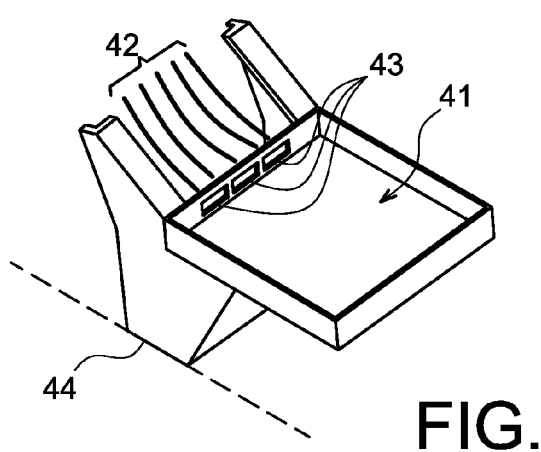

The centre pedestal according to the invention shown in FIGS. 3A to 3D has the following characteristics:
  the equipment is grouped in a single equipment module 40, for example a parallelepiped-shaped module with the particular feature of integrating mainly mechanical and electrical equipment,
  the equipment module 40 is integrated into a recess 45, for example parallelepiped in shape, formed in the upper part of a support frame 41, for example a horizontal part, using a fast insertion device (second electrical connectors 43), the equipment module largely makes use of a multiplexed wiring principle to significantly reduce the wiring 42, the support frame 41 that is supported on the deck 34 of the cockpit, is made in a single piece, for example made from a composite sandwich, providing very good stiffness combined with low mass.

The equipment module 40 is composed of a single element advantageously provided with first electrical connectors 58 centralised on the front face in order to provide a "Racking" type connection, for example with automatic insertion of these first connectors due to appropriate guidance and locking. This equipment module uses an electrical technology of the digital bus type in preference, facilitating an extreme reduction in wiring. This equipment module 40 forms a single housing, inside which each control is connected by multiplexed signals to aircraft computers that form interfaces between these housings and aircraft systems, the functions performed by the equipment in the pedestal according to prior art being shifted into these computers. This equipment module 40 can achieve significant savings particularly in terms of mass, heat, wiring, cost, stiffness, aircraft integration.

Figure 4A:
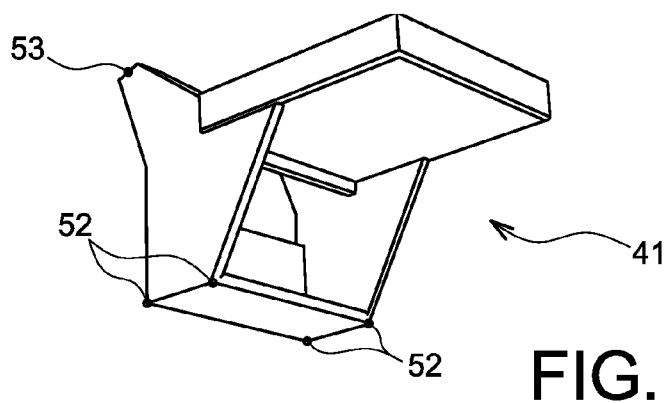
FIGS. 4A to 4C show the frame for the centre pedestal according to the invention.
Figure 4B:
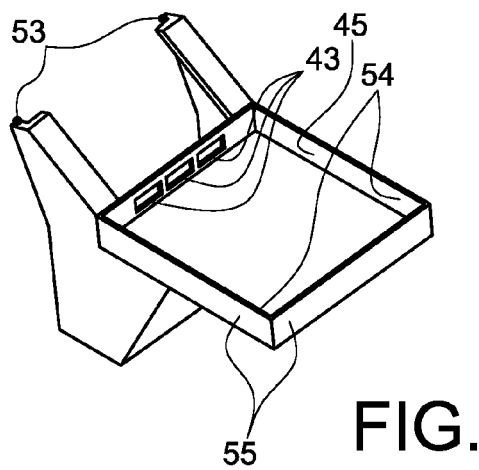
Figure 4C:
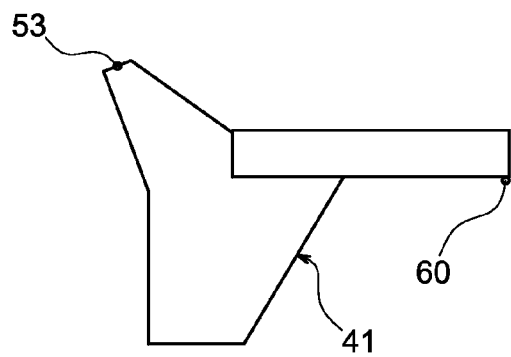

The frame 41 shown in FIGS. 4A to 4C, is made of a single piece made from a composite sandwich, for example Nomex honeycomb carbon, which gives excellent stiffness for low mass.

This frame 41 comprises:
- at least two, and for example four attachment points 52 in the lower part to fix it onto the cockpit deck,
- at least two attachment points 53 in the upper part to fix it onto the cockpit instrument panels,
- an upper face, for example horizontal, comprising a recess 45 in which the equipment module 40 can be fitted, advantageously comprising:
  - second electrical insertion connectors 43, performing the function of the equipment module 40 after electrical insertion,
  - two reinforced zones 54,
  - an impact-protection 55 achieved by insert moulding on the periphery of this horizontal face.

Figure 5:
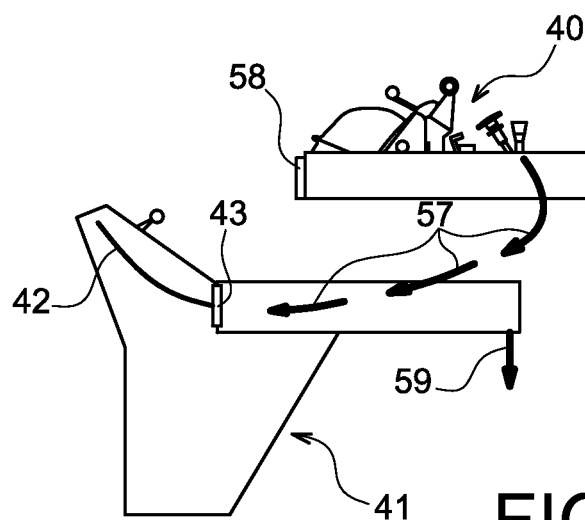
FIG. 5 shows integration of the equipment module 40 onto the frame 41, in the centre pedestal according to the invention.

FIG. 5 shows attachment of the equipment module 40 onto the frame 41, the insertion trajectory being represented by the arrows 57. This attachment includes firstly connection of the first electrical connectors 58 of the equipment module 40 in the second electrical connectors 43 of the frame, and then final locking 59 of the equipment module 40 into the recess 45 of the upper face of the frame 41, for example using two through screws 59 located under the horizontal part of the frame 41.

Figure 6:
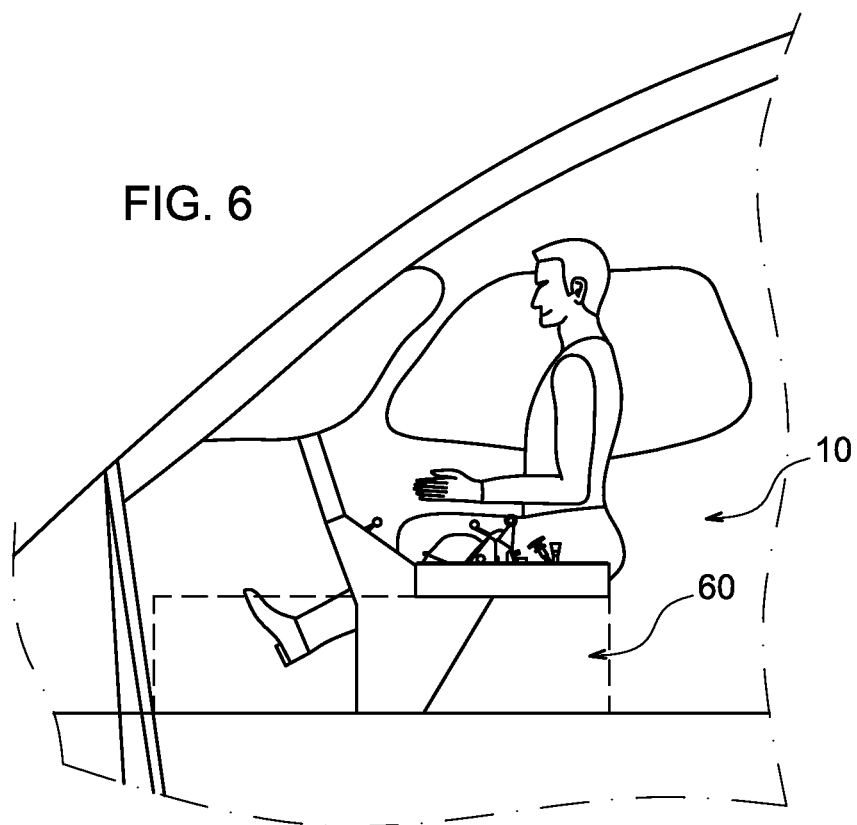
FIG. 6 shows the space saving possible due to the centre pedestal according to the invention.

The invention can release a very significant volume 60 under the centre pedestal and in the front dead zone as shown in FIG. 6.

Figure 7A:
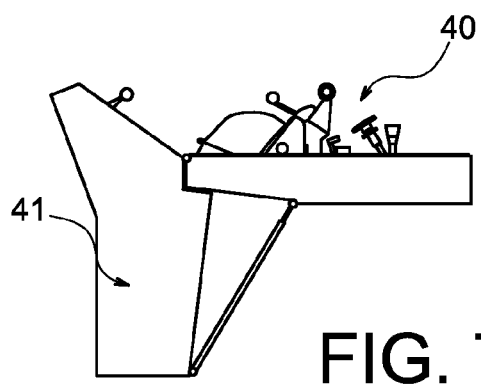
FIGS. 7A to 7C show a variant embodiment of the centre pedestal according to the invention.
Figure 7B:
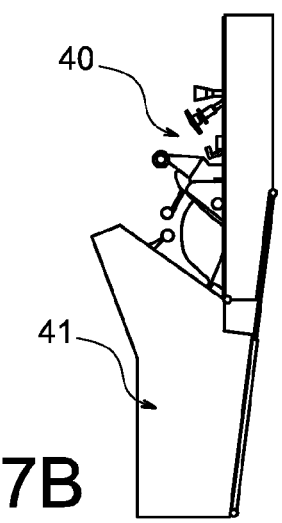
Figure 7C:
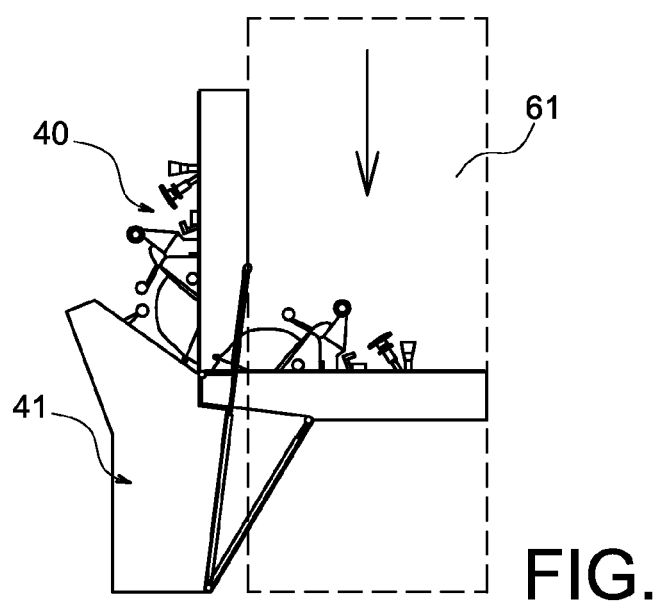

In one variant embodiment of the invention, the upper face of the frame 41 supporting the equipment module 40 is articulated by means of two actuators arranged on the side, not shown in the figures. The operation to raise this upper face may be done manually. In this case, after the safety devices have been released, this upper face is raised up to the top stop. The actuators are there simply for guidance and for power assistance (same principle as car rear door assistance actuators). FIGS. 7A, 7B, 7C thus show this upper face of the centre pedestal according to the invention, in the low position, in the high position and in a superposition of these two positions respectively, showing the space saving 61.

But this operation to raise the upper face may also be done automatically, for example using a hydraulic-electric system.

The main advantage of this variant embodiment is that it releases more space, it gives better access from the top to the bottom so that other equipment can be integrated in the deck under the centre pedestal, and it facilitates maintainability towards the front and possibly facilitates access to the pilots' seats.

The invention claimed is:

1. A center pedestal for the attachment of a plurality of control and instrumentation equipment for an aircraft cockpit, wherein the center pedestal comprises:
   an equipment module in which the plurality of control and instrumentation equipment is grouped and integrated into a single housing, the equipment module comprising at least one first electrical connector centralized on a front face of the equipment module and connected to the plurality of control and instrumentation equipment; and
   a single-piece support frame comprising an upper face provided with a recess, the single-piece support frame comprising at least one second electrical connector located at a bottom of the recess and configured to be connected to computers onboard an aircraft in which the equipment module is installed;
   wherein the at least one first electrical connector of the equipment module is inserted into the at least one second electrical connector so as to connect the controls of the equipment module and the computers onboard the aircraft; and
   wherein the upper face of the single-piece support frame is articulated for providing a volume of space under the center pedestal.

2. The center pedestal according to claim 1, wherein the equipment module comprises connection wiring, and wherein the connection wiring is multiplexed wiring.

3. The center pedestal according to claim 1, wherein the single-piece support frame comprises a composite sandwich.

4. The center pedestal according to claim 3, wherein the composite sandwich comprises a Nomex® honeycomb carbon.

5. The center pedestal according to claim 1, wherein the single-piece support frame comprises:
   at least two attachment points in a lower part of the single-piece support frame that are configured to fix the single-piece support frame onto the cockpit deck,
   at least two attachment points in an upper part of the single-piece support frame that are configured to fix the single-piece support frame onto the cockpit instrument panels.

6. The center pedestal according to claim 1, wherein the upper face of the single-piece support frame is articulated using two lateral actuators.

7. The center pedestal according to claim 1, wherein the center pedestal is used in an aircraft.

8. An aircraft comprising a center pedestal according to claim 1.

* * * * *